(12) United States Patent
Feng et al.

(10) Patent No.: US 9,347,573 B2
(45) Date of Patent: May 24, 2016

(54) CHECK VALVE WITH REDUCED OPENING SPEED

(71) Applicant: Hamilton Sunstrand Corporation, Windsor Locks, CT (US)

(72) Inventors: Feng Feng, South Windsor, CT (US); Josh Kamp, Glastonbury, CT (US)

(73) Assignee: Hamilton Sundstrand Corporation, Winsdor Locks, CT (US)

( * ) Notice: Subject to any disclaimer, the term of this patent is extended or adjusted under 35 U.S.C. 154(b) by 177 days.

(21) Appl. No.: 14/219,558

(22) Filed: Mar. 19, 2014

(65) Prior Publication Data

US 2015/0267824 A1  Sep. 24, 2015

(51) Int. Cl.
 *F16K 15/03* (2006.01)
 *F16K 47/00* (2006.01)

(52) U.S. Cl.
 CPC .............. *F16K 15/038* (2013.01); *F16K 47/00* (2013.01); *Y10T 137/0379* (2015.04); *Y10T 137/785* (2015.04)

(58) Field of Classification Search
 CPC ....... F16K 15/03; F16K 47/00; F16K 15/038; Y10T 137/785

USPC ............................................. 137/512.1, 527
See application file for complete search history.

(56) References Cited

U.S. PATENT DOCUMENTS 4,942,898 A * 7/1990 Osowski ................. E01F 5/005
                                                                137/454.2

* cited by examiner

*Primary Examiner* — Kevin Lee
*Assistant Examiner* — P. Macade Nichols
(74) *Attorney, Agent, or Firm* — Kinney & Lange, P.A.

(57) ABSTRACT

A check valve for a housing with adjacent first and second apertures separated by a septum comprises a hinge pin, a first flapper, and a second flapper. The hinge pin is located downstream of the septum. The first flapper is anchored via the hinge pin, and is rotatable about the hinge pin to block the first aperture when in a closed position. The second flapper is anchored via the hinge pin, and comprises a primary flapper section and a counterbalance section. The primary flapper section is rotatable about the hinge pin to block the second aperture when in a closed position. The counterbalance section extends upstream from and substantially parallel to the primary flapper section, towards the first aperture.

18 Claims, 3 Drawing Sheets

CHECK VALVE WITH REDUCED OPENING SPEED

BACKGROUND

The present invention relates generally to fluid flow valves, and more particularly to a check valve with reduced or controlled opening speed.

Check valves are one-way valves used in a variety of applications to facilitate mono-directional fluid flow. When pressure differential across a check valve in the flow direction exceeds a cracking pressure, the valve opens. Check valves can take a variety of forms, including diaphragm, ball, duckbill, and swing valves. Some check valves have apertures covered, in a closed state, by hinged flappers that can only open in one direction (i.e. in a fluid flow direction). Such check valves typically include stop pins that halt opening of the flappers at a predetermined maximum angle. When differential pressure across the check valve drops sufficiently, or changes directions, the check valve closes.

The flappers of flapper-based check valves can be damaged by repeated impact against stop pins. This damage can, for instance, take the form of cracking or deformation, and reduces part lifetimes.

SUMMARY

A check valve for a housing with adjacent first and second apertures separated by a septum comprises a hinge pin, a first flapper, and a second flapper. The hinge pin is located downstream of the septum. The first flapper is anchored via the hinge pin, and is rotatable about the hinge pin to block the first aperture when in a closed position. The second flapper is anchored via the hinge pin, and comprises a primary flapper section and a counterbalance section. The primary flapper section is rotatable about the hinge pin to block the second aperture when in a closed position. The counterbalance section extends upstream from and substantially parallel to the primary flapper section, towards the first aperture.

DETAILED DESCRIPTION

Conventional check valves with hinged flappers can be damaged when flappers open rapidly and impact against stop pins. The present invention reduces wear and increases part lifetimes by reducing the opening speeds of hinged flappers, such that flapper impact against stop pins is less forceful.

Figure 1:
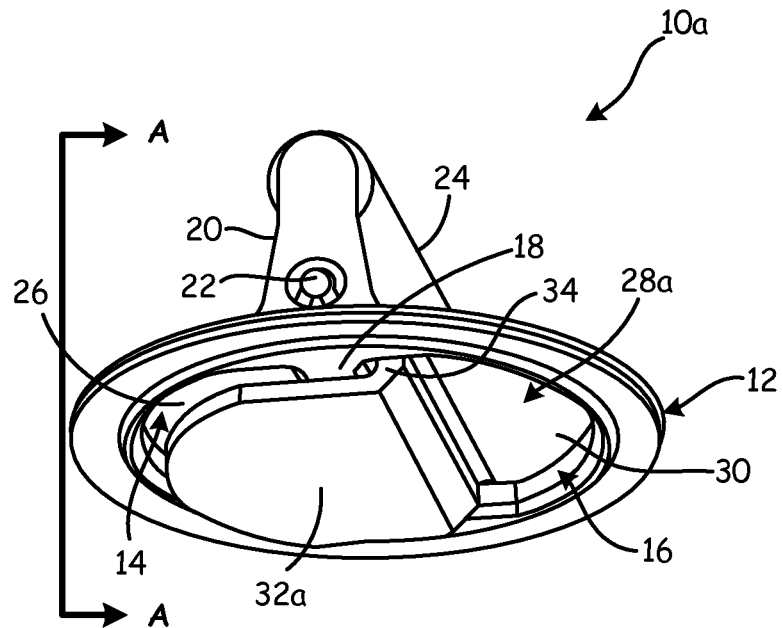
FIG. 1 is perspective view of one embodiment of a check valve according to the present invention.
Figure 2:
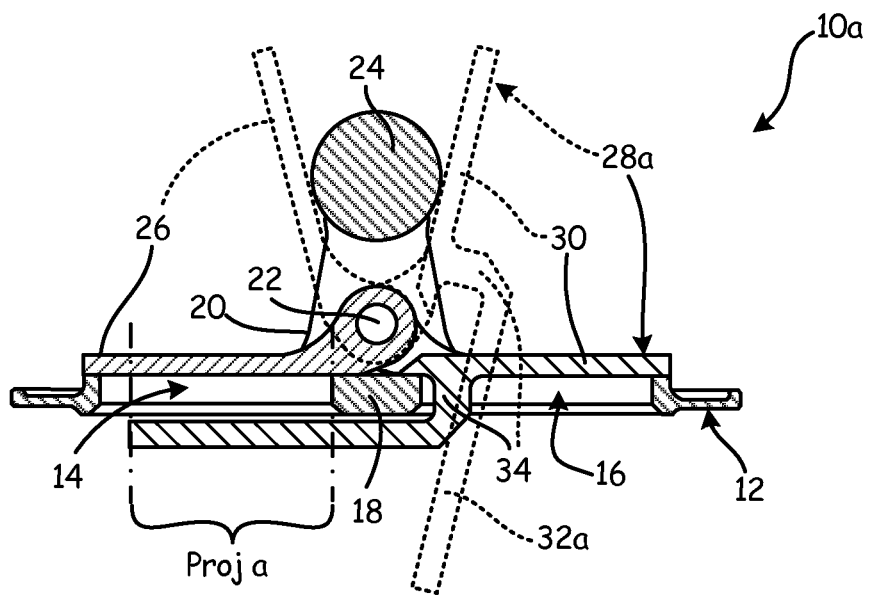
FIG. 2 is a cross-sectional view of the check valve, through section line A-A of FIG. 1, illustrating both closed (solid) and open (phantom) states of the check valve.
Figure 3:
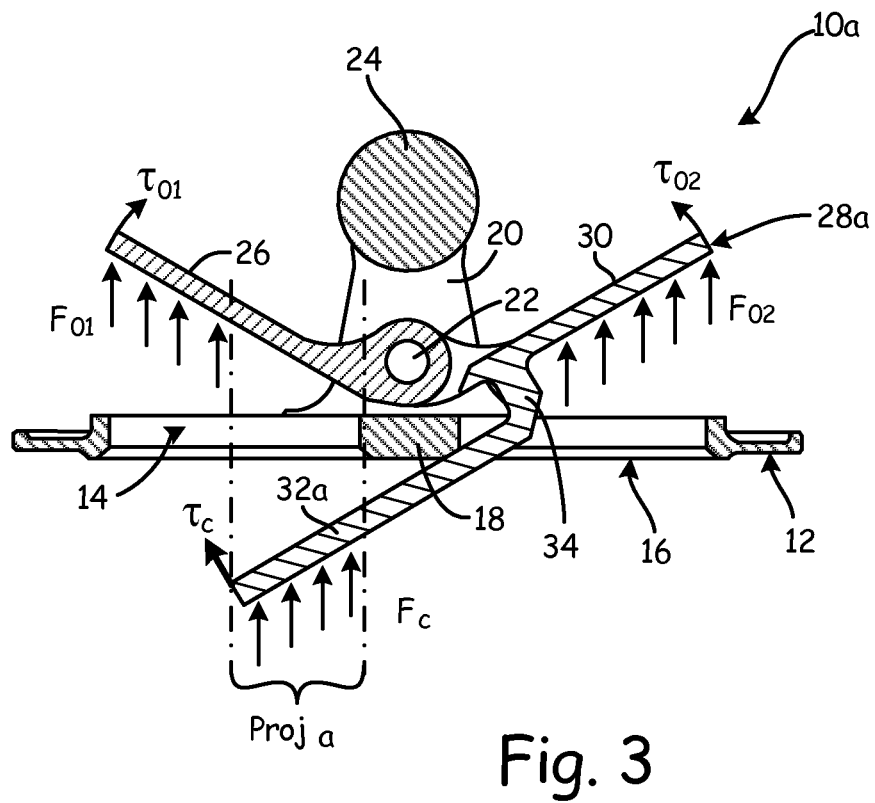
FIG. 3 is a cross-sectional view of the check valve, through section line A-A of FIG. 1, illustrating forces on the valve in an intermediate state.

FIGS. 1-3 illustrate check valve 10a, one embodiment of a check valve according to the present invention. FIG. 1 is a perspective view of check valve 10a. FIG. 2 is a cross-sectional view of check valve 10a through section line A-A of FIG. 1, illustrating open (solid lines) and closed (phantom) states of check valve 10a. FIG. 3 is a cross-sectional view of check valve 10a through section line A-A of FIG. 1, illustrating an intermediate state of check valve 10a, as well as forces and torques on check valve 10a. Check valve 10a can, for example, be a fluid flow check valve for a gas turbine bleed air management system.

FIGS. 1-3 depict housing 12 with first aperture 14 and second aperture 16 separated by septum 18. Housing 12 further comprises post 20, which supports hinge pin 22 and stop pin 24. Hinge pin 22 rotatably anchors first flapper 26 and second flapper 28a. Second flapper 28a comprises primary flapper section 30, counterbalance section 32a, and leg 34.

Housing 12 is a rigid, fluid constraining casing. In the depicted embodiment, housing 12 is a substantially or locally planar wall. In other embodiments, housing 12 can, for instance, be a tube or surface of any construction. As illustrated in FIG. 1, first and second apertures 14 and 16 are symmetric, substantially semicircular openings through housing 12, separated by septum 18. Apertures 14 and 16 can take other forms in alternative embodiments, and need not be identical in shape and/or size. First and second flappers 26 and 28a are hinged about hinge pin 22, which is situated immediately downstream of septum 18. In a closed position, first and second flappers 26 and 28a align with and obstruct first and second apertures, respectively. A differential cracking pressure across check valve 10a exerts an opening force and corresponding opening torque on first and second flappers 28a that causes first and second flappers 26 and 28a to rotate about hinge 22 until halted by stop pin 24 at an open position, as discussed in further detail below. While first and second flappers 26 and 28b are in the open position, check valve 10a is in an open state that allows substantially free fluid flow. While first and second flappers are in the closed position, check valve 10a is in a closed state that prevents fluid flow. As illustrated herein, any positive differential pressure across check valve 10a (i.e. greater pressure upstream than downstream) will cause check valve 10a to open and remain open, while negative differential pressure across check valve 10a (i.e. greater pressure downstream than upstream) will cause check valve 10a to close and remain closed. In alternative embodiments, first and second flappers 26 and 28a can be biased towards a closed position, such that at least a threshold differential cracking pressure is required to cause check valve 10a to open.

As illustrated in FIGS. 1-3, second flapper 28a comprises primary flapper section 30, counterbalance section 32a, and leg 34. Primary flapper section 30 substantially parallels first flapper 26. First flapper 26 and primary flapper section 30 substantially match the shape and size of first and second apertures 14 and 16, respectively, and completely block first and second apertures 14 and 16 in the closed position, creating a fluid seal. In the depicted embodiment, counterbalance section 32a extends upstream from and substantially parallel to primary flapper section 30. Leg 34 extends connections counterbalance section 32a to primary flapper section 30. When check valve 10a is in the closed state, and first and second flappers 26 and 28a in their respective closed positions, leg 34 passes through second aperture 16 and counterbalance section 32a extends parallel to first flapper 26, partially occluding first aperture 14. While check valve 10a is in the closed state, counterbalance section 32a is situated on the opposite side of housing 12 from first flapper 26 and primary flapper section 30. In some embodiments, counterbalance section 32a can occlude 75% or more of first aperture 14 while second flapper 28a is in its closed position. In further embodiments, counterbalance section 32a can occlude 80% or more of first aperture 14 while second flapper 28a is in its closed position.

Counterbalance section 32a reduces the opening speed of check valve 10a, reducing the impact force of first and second flappers 26 and 28a, respectively, on stop pin 24. When check valve 10a experiences a positive differential pressure, fluid pressure exerts a first opening force $F_{O1}$ on first flapper 26, which translates to first opening torque $\tau_{O1}$, and a second opening force $F_{O2}$ on primary flapper section 30 of second flapper 28a, which translates to a second opening torque $\tau_{O2}$ (see FIG. 3). By partially occluding first aperture 14 while check valve 10a is in a closed state, counterbalance section 32a reduces opening force $F_{O1}$, and correspondingly reduces first opening torque $\tau_{O1}$. As illustrated in FIGS. 2 and 3, the extent to which counterbalance section 32a occludes first aperture 14 depends on the angle of rotation of second flapper 28a, and is described by aperture projection $Proj_a$. Generally, opening force $F_{O1}$ is reduced by substantially the fraction of first aperture 14 covered by aperture projection $Proj_a$. Where first aperture 14 is 80% occluded by counterbalance section 32a, for instance, opening force $F_{O1}$ is correspondingly reduced by approximately 80%, resulting in a slower opening speed of first flapper 26. As second flapper 28a opens, aperture projection $Proj_a$ decreases, and opening force $F_{O1}$ is correspondingly less diminished, until second flapper 28a opens sufficiently that counterbalance section 32a no longer occludes first aperture 14 at all, and aperture projection $Proj_a$ disappears entirely. Because first opening torque $\tau_{O1}$ on first flapper 26 is the cross product of opening force $F_{O1}$ and the lever arm defined by first flapper 26, however, first opening torque $\tau_{O1}$ tends to decrease as first flapper 26 shifts from the closed position to the open position. Counterbalance section 32a thus provides the greatest reduction to first opening torque $\tau_{O1}$ when first opening torque $\tau_{O1}$ would naturally be greatest (i.e. when check valve 10a is in a closed state).

Counterbalance section 32a also slows the opening of second flapper 28a. When check valve 10a is exposed to positive differential pressure, counterbalance section 32a experiences a countervailing force $F_C$ that translates to a countervailing torque $\tau_C$ that opposes second opening torque $\tau_{O2}$. Second opening torque $\tau_{O2}$ is greater than countervailing torque $\tau_C$, such that the net torque applied by positive differential pressure across check valve 10a always tends to rotate second flapper 28b towards its open position. Countervailing torque $\tau_C$ tends to reduce the speed at which second flapper 28a opens, however, thereby reducing the force of impacts of primary flapper section 30 on stop pin 24. Moreover, counterbalance section 32a contributes additional distributed mass to second flapper 28a, increasing its moment of inertia about hinge pin 22 and correspondingly decreasing the opening speed of second flapper 28a for a given differential cracking pressure across check valve 10a.

Figure 4:
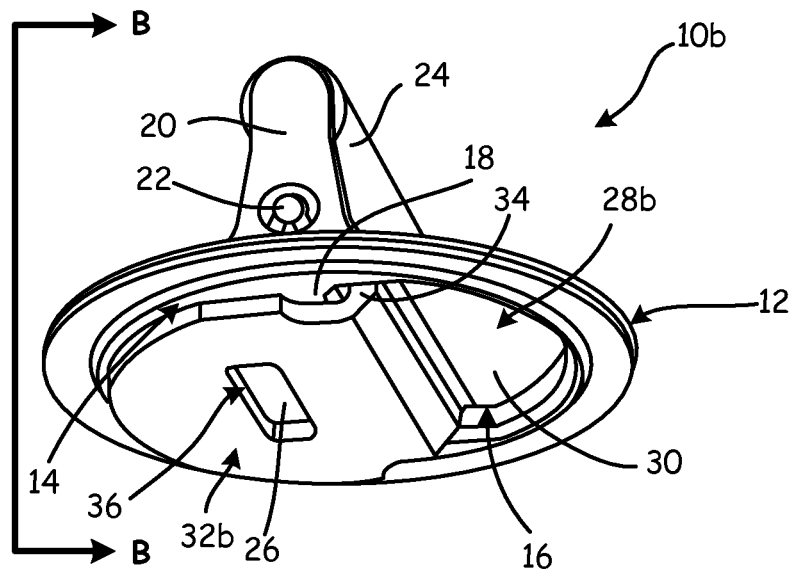
FIG. 4 is perspective view of another embodiment of a check valve according to the present invention, with section line B-B.
Figure 5:
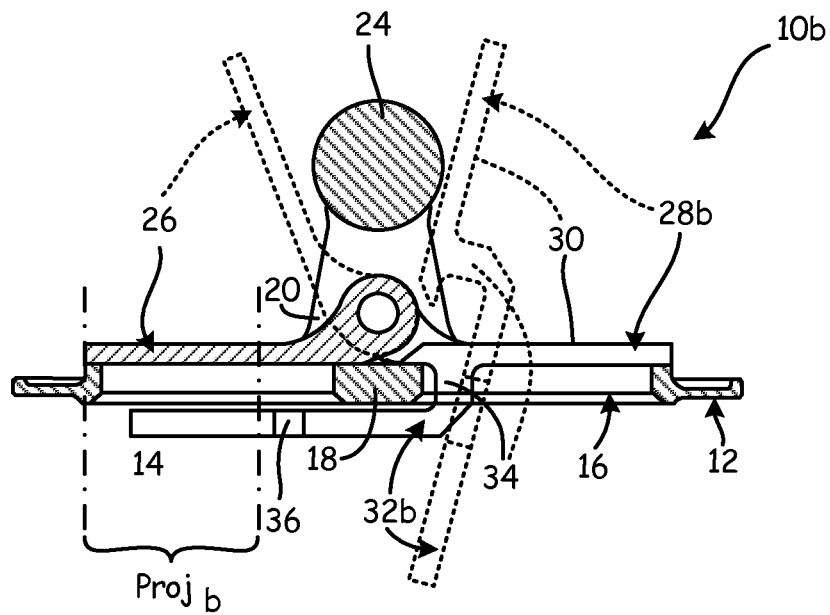
FIG. 5 is a cross-sectional view of the check valve, through section line B-B of FIG. 4, illustrating both closed (solid) and open (phantom) states of the check valve.
Figure 6:
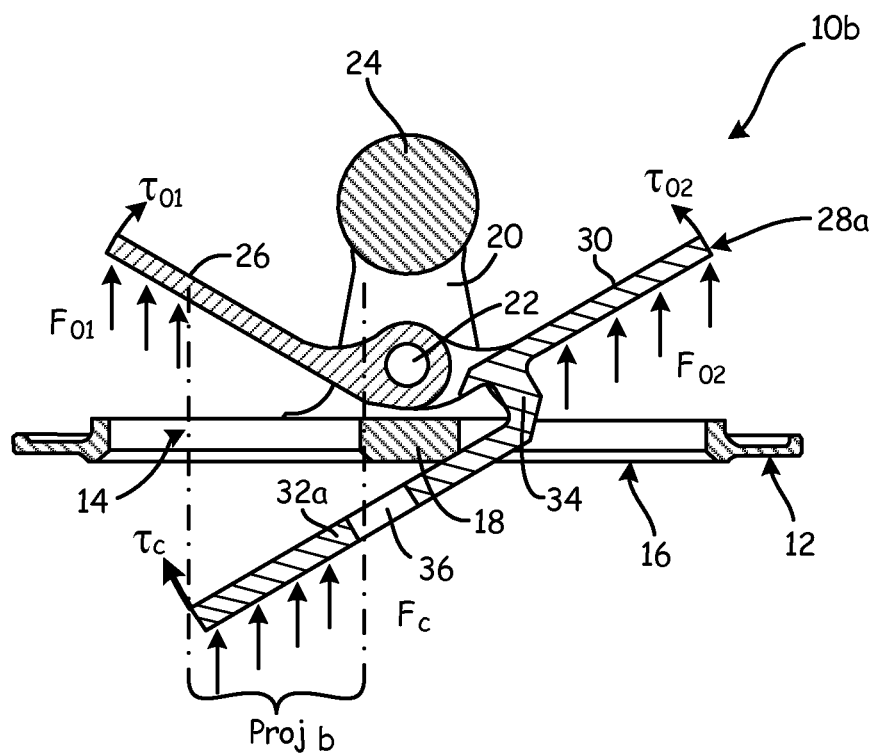
FIG. 6 is a cross-sectional view of the check valve, through section line B-B of FIG. 4, illustrating forces on the valve in an intermediate state.

FIGS. 4-6 illustrate check valve 10b, another embodiment of a check valve according to the present invention. FIG. 4 is a perspective view of check valve 10b, with section line B-B. FIG. 5 is a cross-sectional view of check valve 10b through section line B-B, illustrating open and closed states of check valve 10b. FIG. 6 is a cross-sectional view of check valve 10b through section line B-B, illustrating an intermediate state of check valve 10b, as well as forces and torques on check valve 10a. Check valve 10b can be substantially functionally and structurally identical to check valve 10a, except as described hereinafter.

Check valve 10b has second flapper 28b with counterbalance section 32b. Unlike counterbalance section 32a, counterbalance section 32b has third aperture 36, an opening aligned with first aperture 14 and situated in a region of counterbalance section 32b near septum 18 while first flapper 28b is in its closed position. In some embodiments, counterbalance section 32b may also extend further across first aperture 14, extending at most across the entirety of first aperture 14, as shown in FIG. 5. The total area of first aperture 14 occluded by counterbalance section 32b is reduced by the area of third aperture, as illustrated by aperture projection $Proj_b$. In the illustrated embodiment, for example, counterbalance section 32b may occlude substantially all of aperture 14, less approximately 20% uncovered by third aperture 36, such that in total counterbalance section 32b occludes substantially 80% of first aperture 14. The particular size and shape of third aperture 36 can vary without departure from the present invention. Third aperture 36 can, for example, be a substantially semicircular or rectangular hole through counterbalance section 32b.

When check valve 10b is in its closed state, or close to its closed state, counterbalance section 32b permits opening force $F_{O1}$ primarily on a portion of first flapper 26 close to hinge pin 22, resulting in little opening torque $\tau_{O1}$ due to the shortness of the effective lever arm. As a result, first flapper 26 of check valve 10b tends to open more slowly than first flapper 26 of check valve 10a, for a given fraction of first aperture 14 occluded by counterbalance sections 32a or 32b.

Check valves 10a and 10b reduce the opening speed of first and second flappers 26 and 28 (in either embodiment, 28a or 28b), respectively, by reducing opening first torque $\tau_{O1}$, opposing second opening torque $\tau_{O2}$ with countervailing torque $\tau_C$, and increasing the moment of inertia of second flapper 28. This reduced opening speed increases the longevity of check valves 10a and 10b by reducing or avoiding cracking and/or deformation due to high-speed flapper impacts on stop pin 24.

Discussion of Possible Embodiments

The following are non-exclusive descriptions of possible embodiments of the present invention.

A check valve for a housing with adjacent first and second apertures separated by a septum, the check valve comprising: a hinge pin located downstream of the septum; a first flapper anchored via the hinge pin, and rotatable about the hinge pin to block the first aperture when in a closed position; a second flapper anchored via the hinge pin, the second flapper comprising: a primary flapper section rotatable about the hinge pin to block the second aperture when in a closed position; and a counterbalance section extending upstream from and substantially parallel to the primary flapper section, towards the first aperture.

The check valve of the preceding paragraph can optionally include, additionally and/or alternatively, any one or more of the following features, configurations and/or additional components:

A further embodiment of the foregoing check valve, further comprising a stop pin situated downstream of the hinge pin, and disposed to halt opening of the first flapper and the second flapper, such that the first and second flappers contact the stop pin in a fully open position.

A further embodiment of the foregoing check valve, wherein the second flapper is rotatable such that the counterbalance section occludes a portion of the first aperture when in the closed position.

A further embodiment of the foregoing check valve, wherein the counterbalance section occludes at least 75% of the first aperture when the second flapper is in the closed position.

A further embodiment of the foregoing check valve, wherein the counterbalance section occludes at least 80% of the first aperture when the second flapper is in the closed position.

A further embodiment of the foregoing check valve, wherein the counterbalance section has a third aperture extending therethrough.

A further embodiment of the foregoing check valve, wherein, when the second flapper is in the closed position, the counterbalance section overlaps substantially the entirety of the first aperture and the third aperture is situated upstream of the first aperture.

A further embodiment of the foregoing check valve, wherein, when the second flapper is in the closed position, the third aperture is aligned with the first aperture.

A further embodiment of the foregoing check valve, wherein, when the second flapper is in the closed position, the third aperture is situated upstream of a region of the first aperture adjacent the septum.

A further embodiment of the foregoing check valve, wherein the first and second apertures are substantially hemi-circular.

A method of reducing opening speed of a check valve having first and second flappers rotatably anchored to block first and second apertures, respectively, when in a closed position, the method comprising: counterbalancing the second aperture with a counterbalance section extending from a primary flapper section, towards the first aperture; and partially occluding the first aperture with the counterbalance section, when in the closed position.

The method preceding paragraph can optionally include, additionally and/or alternatively, any one or more of the following features, configurations and/or additional components:

A further embodiment of the foregoing method, wherein differential pressure across the check valve exerts an opening torque on a primary flapper section of the second flapper that causes the second flapper to rotate to unblock the second aperture, and exerts a countervailing torque on the counterbalance section, opposite the opening torque, thereby counterbalancing the second aperture.

A further embodiment of the foregoing method, wherein occluding a portion of the first aperture comprises interposing the counterbalance section downstream of a region of the first aperture closest to the second aperture, in the closed position.

A further embodiment of the foregoing method, wherein occluding a portion of the first aperture comprises interposing the counterbalance section downstream of substantially all of the first aperture in the closed position, and wherein the counterbalance section includes a third aperture aligned with a region of the first aperture closest to the second aperture.

A further embodiment of the foregoing method, wherein partially occluding the first aperture with the counterbalance section comprises occluding at least 75% of the first aperture, in the closed position.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A check valve with adjacent first and second apertures separated by a septum, the check valve comprising:
    a hinge pin located downstream of the septum;
    a first flapper anchored via the hinge pin, and rotatable about the hinge pin to block the first aperture when in a closed position;
    a second flapper anchored via the hinge pin, the second flapper comprising:
        a primary flapper section rotatable about the hinge pin to block the second aperture when in a closed position; and
        a counterbalance section extending upstream from and substantially parallel to the primary flapper section, towards the first aperture; and
    a stop pin situated downstream of the hinge pin, and disposed to halt opening of the first flapper and the second flapper, such that the first and second flappers contact the stop pin in a fully open position.

2. The check valve of claim 1, wherein the second flapper is rotatable such that the counterbalance section occludes a portion of the first aperture when in the closed position.

3. The check valve of claim 2, wherein the counterbalance section occludes at least 75% of the first aperture when the second flapper is in the closed position.

4. The check valve of claim 2, wherein the counterbalance section occludes at least 80% of the first aperture when the second flapper is in the closed position.

5. The check valve of claim 1, wherein the counterbalance section has a third aperture extending therethrough.

6. The check valve of claim 5, wherein, when the second flapper is in the closed position, the counterbalance section overlaps substantially the entirety of the first aperture and the third aperture is situated upstream of the first aperture.

7. The check valve of claim 6, wherein, when the second flapper is in the closed position, the third aperture is aligned with the first aperture.

8. The check valve of claim 7, wherein, when the second flapper is in the closed position, the third aperture is situated upstream of a region of the first aperture adjacent the septum.

9. The check valve of claim 1, wherein the first and second apertures are substantially hemi-circular.

10. A method of reducing opening speed of a check valve having first and second flappers rotatably anchored to block first and second apertures, respectively, when in a closed position, the method comprising:
    counterbalancing the second aperture with a counterbalance section extending from a primary flapper section, towards the first aperture; and
    partially occluding the first aperture with the counterbalance section, when in the closed position; and
    halting opening of the first flapper and the second flapper by means of a stop pin situated downstream of the hinge pin, such that the first and second flappers contact the stop pin in a fully open position.

11. The method of claim 10, wherein differential pressure across the check valve exerts an opening torque on a primary flapper section of the second flapper that causes the second flapper to rotate to unblock the second aperture, and exerts a countervailing torque on the counterbalance section, opposite the opening torque, thereby counterbalancing the second aperture.

12. The method of claim 10, wherein occluding a portion of the first aperture comprises interposing the counterbalance section upstream of a region of the first aperture closest to the second aperture, in the closed position.

13. The method of claim 10, wherein occluding a portion of the first aperture comprises interposing the counterbalance section downstream of substantially all of the first aperture in the closed position, and wherein the counterbalance section includes a third aperture aligned with a region of the first aperture closest to the second aperture.

14. The method of claim 10, wherein partially occluding the first aperture with the counterbalance section comprises occluding at least 75% of the first aperture, in the closed position.

15. A check valve for a housing with adjacent first and second apertures separated by a septum, the check valve comprising:
    a hinge pin located downstream of the septum;
    a first flapper anchored via the hinge pin, and rotatable about the hinge pin to block the first aperture when in a closed position;
    a second flapper anchored via the hinge pin, the second flapper comprising:
        a primary flapper section rotatable about the hinge pin to block the second aperture when in a closed position; and
        a counterbalance section extending upstream from and substantially parallel to the primary flapper section, towards the first aperture, wherein the counterbalance section has a third aperture extending therethrough.

16. The check valve of claim 15, wherein, when the second flapper is in the closed position, the counterbalance section overlaps substantially the entirety of the first aperture and the third aperture is situated upstream of the first aperture.

17. The check valve of claim 16, wherein, when the second flapper is in the closed position, the third aperture is aligned with the first aperture.

18. The check valve of claim 17, wherein, when the second flapper is in the closed position, the third aperture is situated upstream of a region of the first aperture adjacent the septum.

* * * * *